(12) United States Patent
Taliwal

(10) Patent No.: US 7,113,866 B2
(45) Date of Patent: Sep. 26, 2006

(54) METHOD AND DEVICE FOR DETERMINING VEHICLE LANE CHANGES USING A VEHICLE HEADING AND A ROAD HEADING

(75) Inventor: Vikas Taliwal, Palo Alto, CA (US)

(73) Assignee: DaimlerChrysler AG, Stuttgart (DE)

( * ) Notice: Subject to any disclaimer, the term of this patent is extended or adjusted under 35 U.S.C. 154(b) by 57 days.

(21) Appl. No.: 10/868,135

(22) Filed: Jun. 15, 2004

(65) Prior Publication Data

US 2005/0278095 A1 Dec. 15, 2005

(51) Int. Cl.
*G01C 21/26* (2006.01)

(52) U.S. Cl. ........................ 701/208; 701/213

(58) Field of Classification Search .............. None
See application file for complete search history.

(56) References Cited

U.S. PATENT DOCUMENTS

| | | | | |
|---|---|---|---|---|
| 6,385,539 | B1 * | 5/2002 | Wilson et al. | 701/213 |
| 6,502,033 | B1 | 12/2002 | Phuyal | 701/214 |
| 6,502,035 | B1 * | 12/2002 | Levine | 701/301 |
| 2002/0169552 | A1 * | 11/2002 | Hashida | 701/213 |
| 2003/0173127 | A1 * | 9/2003 | Noecker | 180/167 |

FOREIGN PATENT DOCUMENTS

| | | |
|---|---|---|
| EP | 0598518 | 5/1994 |
| JP | 11304512 | 5/1999 |

OTHER PUBLICATIONS

Seth Rogers et al., "Learning to Predict Lane Occupancy Using GPS and Digital Maps," http://citeseer.lst.psu.edu/cache/papers/cs/1135/http:zSzzSzpc19.rtna.dalmlerbenz.comzSz-rogerszSzmlj-99.pdf/learning-to-predict-lane.pdf, no date.
Christopher K.H. Wilson et al., "The Potential of Precision Maps in Intelligent Vehicles" IEEE International Conference on Intelligent Vehicles, pp. 419-422, Oct. 1998.
Seth Rogers et al., "Mining GPS Data to Augment Road Models," http://citeseer.ist.psu.edu/cache/papers/cs/3044/http:zSzzSzpc19.rtna.daimlerbenz.comzSz—rogerszSzkdd-99.pdf/rogers99mining.pdf.

* cited by examiner

*Primary Examiner*—Michael J. Zanelli
(74) *Attorney, Agent, or Firm*—Davidson, Davidson & Kappel, LLC

(57) ABSTRACT

A method for determining a lane change by a vehicle includes determining a vehicle heading using for example GPS information, determining a road heading at a location of the vehicle, and when the vehicle is on the multilane road, determining a lane change as a function of a heading difference between the vehicle heading and the road heading. A vehicle with a lane change determination device is also provided.

20 Claims, 2 Drawing Sheets

METHOD AND DEVICE FOR DETERMINING VEHICLE LANE CHANGES USING A VEHICLE HEADING AND A ROAD HEADING

BACKGROUND

The present invention relates to a method and device for determining vehicle lane changes using a vehicle heading, for example as determined by global satellite positioning device, and a road heading, for example a road heading from a digital road map.

GPS devices for vehicles can provide position information as well as vehicle direction information. The vehicle direction information, also called vehicle heading information, also can be derived by a processor on the vehicle from the stream of GPS position information.

Digital road maps, also called street maps, provide all types of digital information on roads, such as streets and highways, such as their physical coordinates and whether the roads are one-way or not. The direction, i.e. heading, of a road at any location thus may be known from the digital road map information.

Christopher K. H. Wilson, Seth Rogers, and Shawn Weisenburger, in "The Potential of Precision Maps in Intelligent Vehicles", IEEE International Conference on Intelligent Vehicles, pages 419–422, October 1998, describe a method for adding lane information to digital road maps using a differential GPS device. This article is hereby incorporated by reference herein.

In "Learning to Predict Lane Occupancy Using GPS and Digital Maps" by Seth Rogers, Pat Langley, Christopher Wilson published by the DaimlerChrysler Research and Technology Center, 1510 Page Mill Road, Palo Alto. Calif. 94304-1135, the authors describe recognizing when a vehicle changes lanes based on the position of a GPS receiver with respect to a lane boundary. This article is hereby incorporated by reference herein.

"Mining GPS Data to Augment Road Models" by Seth Rogers, Pat Langley, Christopher Wilson" from 1999, published by the DaimlerChrysler Research and Technology Center, 1510 Page Mill Road, Palo Alto. Calif. 94304-1135, U.S. Pat. No. 6,502,033, European Patent Application No. 0 598 518, and Japanese Patent Application Publication No. 11304512 A, all of which are hereby incorporated by reference herein, describe other prior art.

To determine a lane change by a vehicle, on-board cameras and image processing have been known to detect lane boundaries and crossing of the boundaries. The use of turn signal indicators to indicate a lane change is also known.

SUMMARY OF THE INVENTION

An object of the present invention is to reliably determine lane changes using differences in vehicle heading and road heading information.

The present invention provide a method for determining a lane change by a vehicle comprising the steps of: determining a vehicle heading; determining a road heading at a location of the vehicle; and when the vehicle is on the multilane road, determining a lane change as a function of a difference between the vehicle heading and the road heading.

The vehicle heading may be determined for example using GPS information.

As long as the vehicle follows the road within a lane, the vehicle heading will more or less coincide with the road heading. As soon as the vehicle begins to change lanes, the vehicle heading will depart from the road heading in one direction. About halfway through the lane change the heading difference between the vehicle heading and the road heading will reach a maximum, and then return to about zero as the lane change is completed.

The heading difference thus provides a reliable and efficient way to determine a lane change.

Preferably, an integral of the heading difference with respect to the distance traveled by the vehicle from one zero crossing to the next is calculated. The integral represents the lateral-to-the road movement of the vehicle. If the integral exceeds a certain amount, a lane change can be determined. The certain amount may be a function of the road on which the vehicle is traveling. For example, for a certain U.S. highway, the certain amount may be 3 m. If the integral is even larger, for example 6 m, a double lane change may be determined.

The distance traveled by the vehicle may be computed by multiplying the speed of the vehicle at one instant by the time difference between two instances. Both the time difference and speed may be determined from the GPS device.

Advantageously, an inexpensive GPS device, i.e. a non-differential GPS device, may be used with the present invention.

The road heading preferably is determined using a digital road map containing lane information.

The GPS device alone preferably may be used when the vehicle is traveling above a certain speed, which may indicate for example highway driving, as the GPS heading correlates reliably with vehicle heading at highway speeds. However, lane change determination at lower speeds may also be possible. Other devices such as a gyroscope may also be used to determine the vehicle heading, whether alone or in conjunction with the GPS device.

The method may further include determining if the lane change is to the left or to the right.

The present invention also provides a vehicle comprising a GPS device, a processor receiving an input from the GPS device, and a memory for storing digital road map information including lane information, the processor determining a lane change as a function of the lane information, a vehicle heading and a road heading.

The memory may be a temporary memory which receives the digital road information wirelessly, or may be any other type of memory device, such as an on-board CD-ROM.

BRIEF SUMMARY OF THE DRAWINGS

To illustrate the present invention.

DETAILED DESCRIPTION

Figure 1:
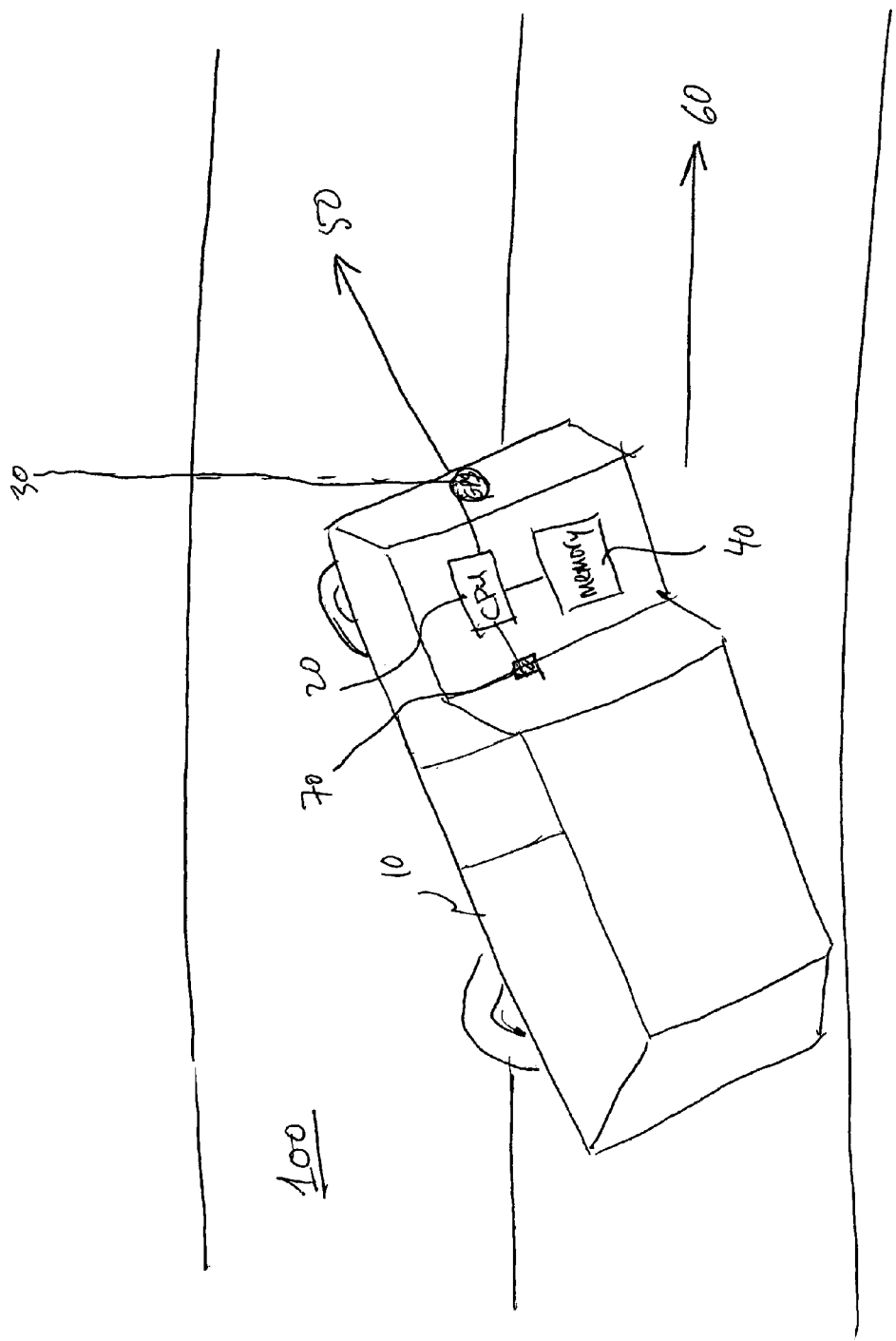
FIG. 1 shows schematically a vehicle according to the present invention performing a lane change.

FIG. 1 shows a vehicle 10 having a processor 20 connected to a GPS receiver 30. A memory 40 provides digital road map information to the processor 20. The digital road map information includes lane information on road 100, which in this case has two lanes for vehicles traveling in one direction. Road 100 may be for example a highway, and road map information can identify the road 100 as a multilane road.

At the location of the vehicle 10, which may be determined from GPS receiver 30, road 100 has a road heading 60 which may be determined from the digital road map information. The heading 60 may be expressed in terms of the clockwise angle of the road with respect to geographical north, for example, and may be provided with the road map information or determined by the processor from two or more data points of the digital road map information mapping the road 100.

A vehicle heading 50 may be determined from GPS receiver 30. In the present invention, the GPS heading information may be used as the vehicle heading 50. The vehicle heading 50 may also be determined using two or more GPS positional data points. The vehicle heading may be expressed as the clockwise angle from geographical north as is typically of GPS information.

If the road 100 thus is heading directly east, heading 60 may be expressed as ninety degrees, and vehicle heading 50 may be for example eighty degrees (the lane change turn being exaggerated in FIG. 1 for clarity purposes). If the vehicle were heading in a road traveling due west, the road heading would be 270 degrees.

The difference between the vehicle heading 50 and the road heading 60 is defined herein as the heading difference (HD=RH−VH), and would in this example by ninety degrees minus eighty degrees, or ten degrees. A positive heading difference thus can indicates a left lane change, while a negative heading difference indicates a right lane change, with the following exception: if the road is heading generally north and the vehicle heading is at or on one side of geographical north and the road heading is at geographical north or one the other side of geographical north, the heading difference may register falsely as a large number. For example, if the road heading is five degrees and the vehicle heading is 355 degrees, the heading difference might register falsely as negative 350 degrees. To eliminate this problem, the heading difference HD may be altered when it exceeds a certain absolute value, for example, 240 degrees, which would not occur in normal multilane driving. Thus HD may calculated as follows: HD=RH−VH when RH−VH is less than 240 degrees and above −240 degrees, and HD=RH−VH−360 degrees when RH−VH is more than 240 degrees, and HD=RH−VH+360 degrees when RH−VH is less than −240 degrees. Thus, in the example above, HD would equal five−355+360 degrees or positive ten degrees, which would indicate a left lane change. Were the road heading 355 degrees and the vehicle heading five degrees, HD would equal 355−5−360 or negative ten degrees, which would indicate a right lane change. The certain value may be other than 240 degrees, but should generally be higher than the maximum normal lane change angle for multilane driving, and lower than 360 minus the maximum normal lane change angle for multilane driving.

Figure 2:
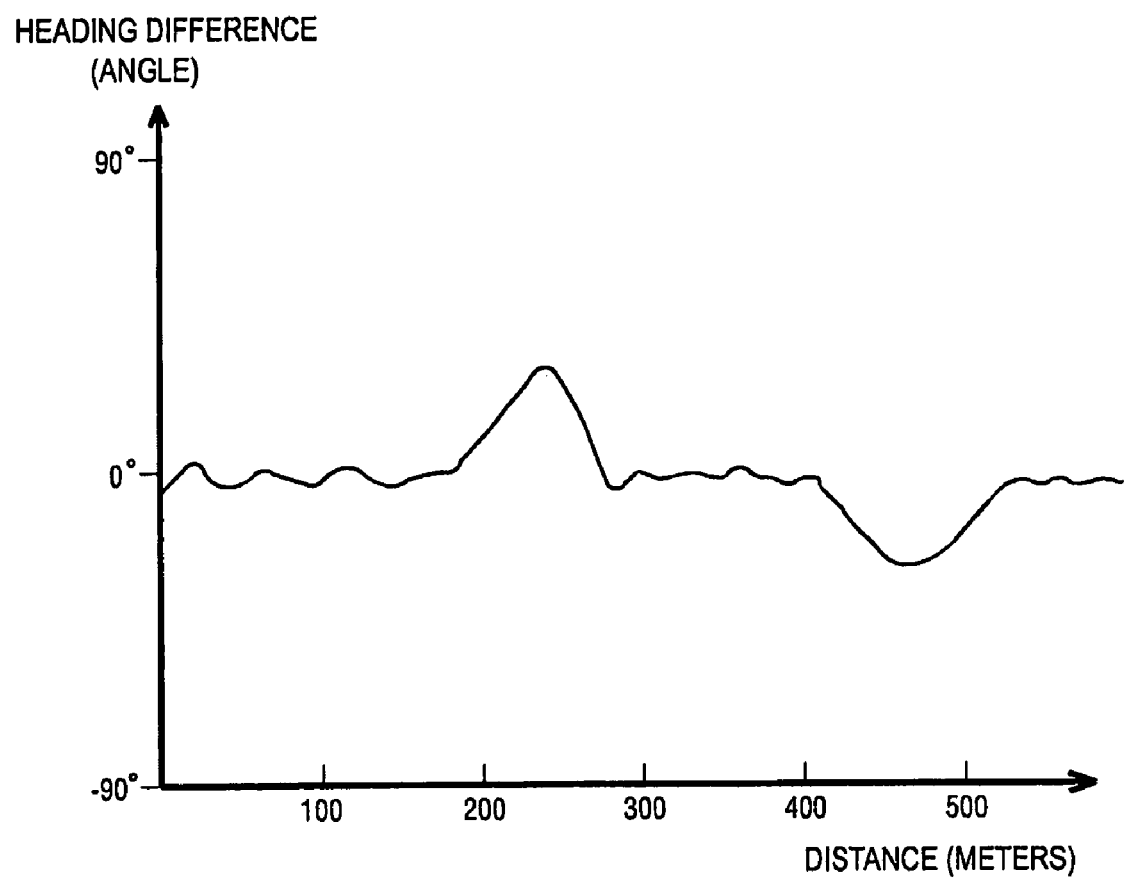
FIG. 2 shows a hypothetical example of a heading difference plotted against vehicle distanced traveled to illustrate the determination of the lane change.

The heading difference HD can be used to determine a lane change, for example as described with respect to FIG. 2. Once a lane change is determined, the number of lanes changed may be output to the driver at a terminal 70 to provide the driver timely advice about which lane to be in order to safely follow a designated route, or used for lane-aware driving aid systems, for example for following another vehicle located in the same lane. The lane-change information may also be used to keep track of when a vehicle leaves a multi-lane road and starts on an off-ramp.

FIG. 2 shows for example a hypothetical heading difference plotted against a hypothetical distance during multilane driving, and indicates for example a lane change to the right during the distance from 200 to 300 meters, and lane change back to the left between 400 and 500 meters.

At other times, the heading difference randomly fluctuates about zero as the driver maintains lane position.

The heading difference can be used to determine a lane change. For example, the integral of the heading difference with respect to distance can be taken between each successive zero crossing of the heading difference. This integral indicates the lateral to the road movement of the vehicle, and if the value exceeds a certain amount a lane change, or more than one lane change, may be indicated.

As a mathematical example, if the lane change operation exhibits a smooth parabolic curve between 200 and 300 meters, the curve may be estimated by an inverse parabolic function as $100 \text{ m}(D-200 \text{ m})-(D-200 \text{ m})^2/25000 \text{ m}^2$, with the D being distance. At 200 and 300 meters HD equals zero, and at 250 meters the heading difference equals 1/10 or 36 degrees. The integral of the inverse parabolic function from 200 to 300 meters equals $(50 \text{ m}*(D-200 \text{ m})^2-(D-200 \text{ m})^3/3)/25000 \text{ m}^2$ at 300 meters minus that value at 200 meters, or 6.67 meters. Thus the vehicle moved laterally to the left 6.67 meters between the 200 and 300 meter distances, which can indicate a two lane change on a U.S. highway. If the integral were negative, a right lane change would be indicated.

The integral in actuality typically would be calculated using processor 20, for example by the following algorithm:

```
start the system at the beginning of a multilane road, such as a highway
heading difference = 0
lateral offset = 0
threshold = 2.8m
while (on the multilane road) do
    at each second, get the vehicle position and the vehicle
    heading from GPS,
    get the road heading at the vehicle position from the digital
    road map and
    calculate the heading difference
    if (heading difference has not crossed zero)
        add heading difference multiplied by distance traveled in the last
        second to lateral offset
    else (heading difference has crossed zero)
        if (lateral offset > n*threshold)
            report "n lane changes to left detected"
        else if (lateral offset < -n*threshold)
            report "n lane changed to right detected"
        else report nothing
        end (if)
        reset lateral offset to zero
    end (if)
end (while)
```

Because of the rapid fluctuations of the heading difference about zero when the vehicle is not changing lanes, the lateral offset never crosses the threshold. The present invention thus provides a reliable way to detect lane changes on a multi-lane road. While integration of the heading difference is preferred to determine a lane change, other determination method could be used, for example based on the heading difference crossing a certain value when it is clear the vehicle is not turning off the multi-lane road.

If the vehicle is generally traveling within a certain speed range, for example during highway driving, the distance traveled by the vehicle may be estimated using time.

GPS as defined herein may include any satellite-based positioning system.

What is claimed is:

1. A method for determining a lane change by a vehicle comprising the steps of:
   determining a vehicle heading;
   determining a road heading at a location of the vehicle; and
   determining if the vehicle is on a multilane road and when the vehicle is on the multilane road, determining a lane change as a function of a heading difference between the vehicle heading and the road heading.

2. The method as recited in claim 1 wherein the vehicle heading is determined using GPS information.

3. The method as recited in claim 1 wherein the determining of the lane change includes determining an integral of the heading difference over a distance traveled by the vehicle.

4. The method as recited in claim 3 wherein the integral is determined between zero crossings of the heading difference.

5. The method as recited in claim 2 wherein the GPS information is derived from an on-board non-differential GPS receiver.

6. The method as recited in claim 1 wherein the road heading is determined using a digital road map containing lane information.

7. The method as recited in claim 1 wherein the determining of a lane change occurs only when the vehicle is traveling above a certain speed.

8. The method as recited in claim 1 further comprising determining if the lane change is to the left or to the right.

9. The method as recited in claim 1 further comprising determining the number of lanes changed during the lane change.

10. The method as recited in claim 1 further comprising providing information on the lane change to permit the driver to be in a proper lane for turning off the multilane road.

11. A vehicle comprising:
    a GPS device;
    a processor receiving an input from the GPS device; and
    a memory for storing digital road map information including lane information, the processor determining a lane change as a function of the lane information, a vehicle heading and a road heading.

12. The vehicle as recited in claim 11 wherein the UPS device is a non-differential GPS receiver.

13. An on-board lane change determination device for a vehicle comprising:
    a GPS device;
    a processor receiving an input from the GPS device; and
    a memory for storing digital road map information including lane information, the processor determining a lane change as a function of the lane information, a vehicle heading and a road heading.

14. A method for determining a lane change by a vehicle traveling comprising the steps of:
    determining a vehicle heading using GPS information;
    determining a road heading at a location of the vehicle; and
    when the vehicle is on a multilane road, determining a lane change as a function of a heading difference between the vehicle heading determined from the GPS information and the road heading.

15. The method as recited in claim 14 wherein the determining of the lane change includes determining an integral of the heading difference over a distance traveled by the vehicle.

16. The method as recited in claim 15 wherein the integral is determined between zero crossings of the heading difference.

17. The method as recited in claim 14 wherein the GPS information is derived from an on-board non-differential GPS receiver.

18. The method as recited in claim 14 wherein the road heading is determined using a digital road map containing lane information.

19. The method as recited in claim 14 wherein the determining of a lane change occurs only when the vehicle is traveling above a certain speed.

20. The method as recited in claim 14 further comprising determining if the lane change is to the left or to the right.

* * * * *